(12) United States Patent
Sun et al.

(10) Patent No.: US 8,102,747 B2
(45) Date of Patent: Jan. 24, 2012

(54) READING DEVICE

(75) Inventors: Ching-Cherng Sun, Taoyuan County (TW); Yeh-Wei Yu, Hsinchu County (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 12/861,840

(22) Filed: Aug. 24, 2010

(65) Prior Publication Data

US 2011/0249544 A1  Oct. 13, 2011

(30) Foreign Application Priority Data

Apr. 8, 2010 (TW) .............................. 99110930 A

(51) Int. Cl.
*G11B 7/00* (2006.01)

(52) U.S. Cl. ...................................................... 369/103
(58) Field of Classification Search .................. 369/103
See application file for complete search history.

(56) References Cited

U.S. PATENT DOCUMENTS

| | | | |
|---|---|---|---|
| 6,995,882 B2 | 2/2006 | Horimai | |
| 7,002,891 B2 | 2/2006 | Horimai | |
| 7,085,025 B2 | 8/2006 | Horimai | |
| 7,085,026 B2 | 8/2006 | Horimai | |
| 7,130,092 B1 | 10/2006 | Horimai | |
| 7,321,541 B2 | 1/2008 | Horimai | |
| 2004/0165518 A1 | 8/2004 | Horimai et al. | |
| 2008/0088896 A1* | 4/2008 | Toishi ............................... 359/3 |
| 2008/0316896 A1* | 12/2008 | Usami ........................... 369/103 |
| 2009/0034397 A1* | 2/2009 | Tanaka ........................... 369/103 |

OTHER PUBLICATIONS

Study of Media Shrinkage in Collinear Holographic Storage System: the Effect of Random Phase Mask.
High density recording of 270 Gbits/inch2 in a coaxial holographic storage system.
Improved performance in coaxial holographic data recording.
Collinear holography.
Collinear technology for a holographic versatile disk.
Improved performance in coaxial holographic data recording, Optics Express, vol. 15, No. 24, Nov. 26, 2007.
Collinear holography, Applied Optics, vol. 44, No. 13, May 1, 2005.
Collinear technology for a holographic versatile disk, Applied Optics, vol. 45, No. 5, Feb. 10, 2006.
Tunable blue laser compensates for thermal expansion of the medium in holographic data storage, Applied Optics, vol. 46, No. 25, Sep. 1, 2007.
2006 ODS Temperature Compensation Strategy for holographic Storage, IEEE, Jan. 1, 2006.
Analytical solution to compensate for thermal expansion change in photopolymer volume holograms using a tunable laser, Applied Optics, vol. 47, No. 6, Feb. 20, 2008. Recording and reading temperature tolerance in holographic data storage, in relation to the anisotropic thermal expansion of a photopolymer, Optics Express, vol. 17, No. 16, Aug. 3, 2009.

* cited by examiner

*Primary Examiner* — Wayne Young
*Assistant Examiner* — Brenda Bernardi
(74) *Attorney, Agent, or Firm* — CKC & Partners Co., Ltd.

(57) ABSTRACT

A reading device includes a spatial light modulator, a zoom lens set, an object lens, an image sensor, and an adjusting module. The spatial light modulator provides a reading beam. The zoom lens set forms the reading beam into a real image. The object lens focuses the real image onto a collinear holographic storage medium and thus produces a diffraction signal. The image sensor converts the diffraction signal into an electric signal. The adjusting module adjusts the optical magnification of the zoom lens set according to the quality of the diffraction signal.

12 Claims, 11 Drawing Sheets

800

800

READING DEVICE

RELATED APPLICATIONS

This application claims priority to Taiwan Application Serial Number 99110930, filed Apr. 8, 2010, which is herein incorporated by reference.

BACKGROUND

1. Technical Field

The present disclosure relates to holographic data storage. More particularly, the present disclosure relates to collinear holography.

2. Description of Related Art

Holographic data storage is a potential replacement technology in the area of high-capacity data storage. Holographic data storage research booms is occurred several times in the past. However, holographic data storage is still a potential replacement technology, not a commercial data storage solution.

Collinear holography is one possible holographic data storage solution. In collinear holography, the signal beam and the reference beam are collinear and are focused onto the disk by the same lens. Traditionally, the signal beam located on the center surrounded by the reference beam. Collinear holography has a simple structure, a possibility of backwards-compatibility, a shorter optical path difference between the signal beam and the reference beam, a lower requirement for the coherence length of the laser beam, a better shift selectivity, a larger wavelength tolerance, a larger medium tilt tolerance, high-capacity data storage, and high speed. Therefore, collinear holography has become the mainstream holographic data storage method.

However, the thermal deformation of the collinear holographic storage medium can change the transmission gratings, the reflection gratings, and the refractive index of the collinear holographic storage medium. As a result of the thermal deformation of the collinear holographic storage medium, the diffracted beam is weakened and has a poor point spread function (PSF).

SUMMARY

According to one embodiment of the present invention, a reading device includes a spatial light modulator (SLM), a zoom lens set, an object lens, an image sensor, and an adjusting module. The spatial light modulator (SLM) provides a reading beam. The zoom lens set forms the reading beam into a real image. The object lens focuses the real image onto a collinear holographic storage medium and thus produces a diffraction signal. The image sensor converts the diffraction signal into an electric signal. The adjusting module adjusts the optical magnification of the zoom lens set according to the quality of the diffraction signal.

According to another embodiment of the present invention, a reading device includes a spatial light modulator (SLM), a zoom lens set, an object lens, a temperature sensor, and a controller. The spatial light modulator (SLM) provides a reading beam. The zoom lens set forms the reading beam into a real image. The object lens focuses the real image onto a collinear holographic storage medium. The temperature sensor measures the temperature of the collinear holographic storage medium. The controller selects the optical magnification of the zoom lens set according to the temperature of the collinear holographic storage medium.

According to yet another embodiment of the present invention, a reading device includes a radial phase modulator, an object lens, and an image sensor. The radial phase modulator modulates a reading beam, such that the modulated reading beam has a constant phase along each radial axis of the reading beam. The object lens focuses the modulated reading beam onto a collinear holographic storage medium and thus produces a diffraction signal. The image sensor converts the diffraction signal into an electric signal.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
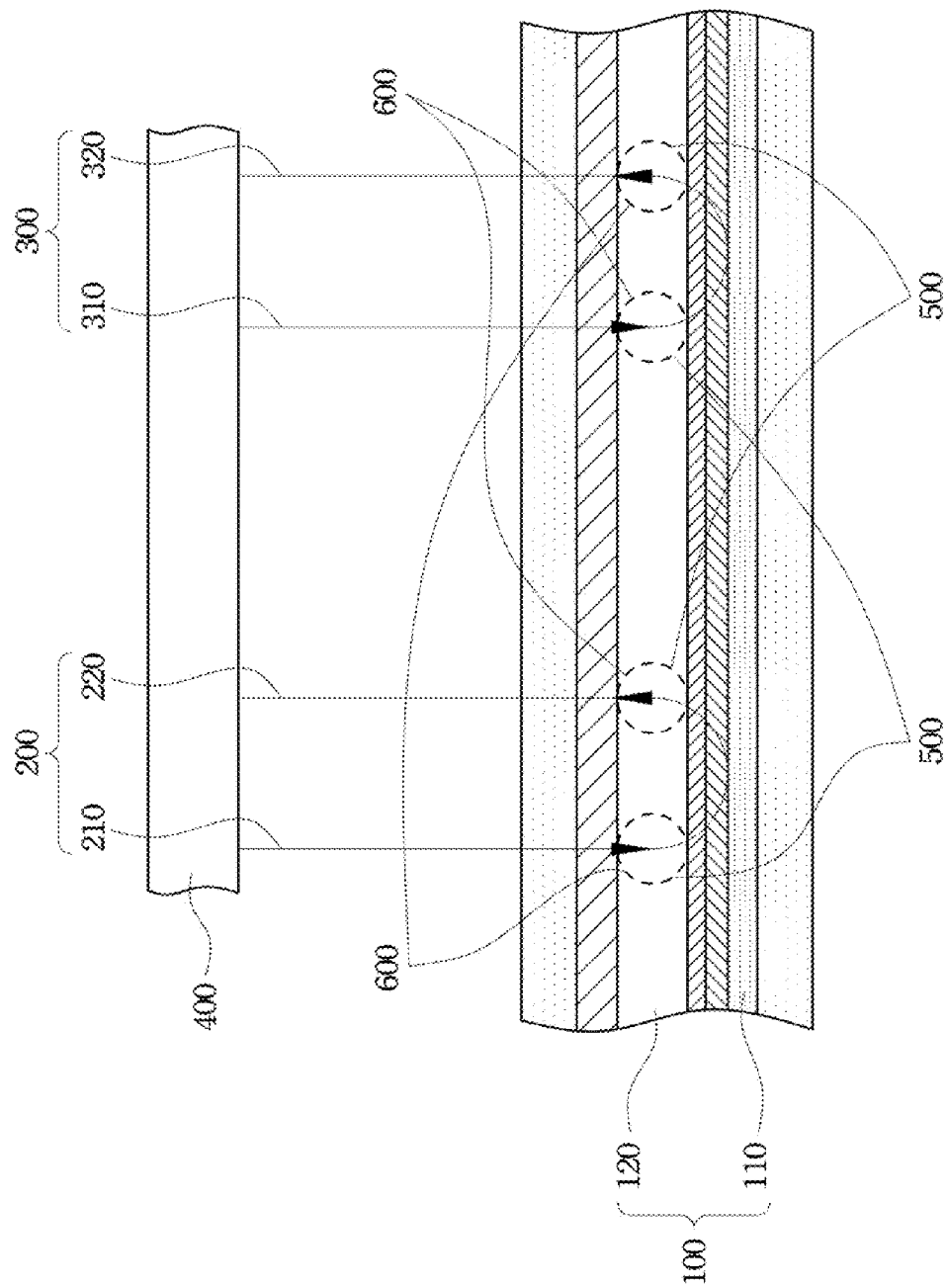
FIG. 1 is a sectional view of a collinear holographic storage medium when the data is written according to one embodiment of the present invention.

FIG. 1 is a sectional view of a collinear holographic storage medium 100 when the data is written according to one embodiment of the present invention. As shown in FIG. 1, the collinear holographic storage medium 100 includes a reflection layer 110 and a recording layer 120. The recording layer 120 is disposed above the reflection layer 110.

When the data is written, a spatial light modulator (SLM) can be used to provide a signal beam 200 and a reference beam 300. At least one lens 400 focuses the signal beam 200 and the reference beam 300 onto the reflection layer 110, thereby creating an interference pattern in the recording layer 120.

As shown in FIG. 1, there are transmission gratings 500 and reflection gratings 600 in the recording layer 120 due to the reflection layer 110. The transmission gratings 500 includes the gratings created by the incident signal beam 210 and the incident reference beam 310 and the gratings created by the reflected signal beam 220 and the reflected reference beam 320. The reflection gratings 600 includes the gratings created by the incident signal beam 210 and the reflected reference beam 320 and the gratings created by the reflected signal beam 220 and the incident reference beam 310. The is transmission gratings 500 and the reflection gratings 600 have different physical properties.

Figure 2:
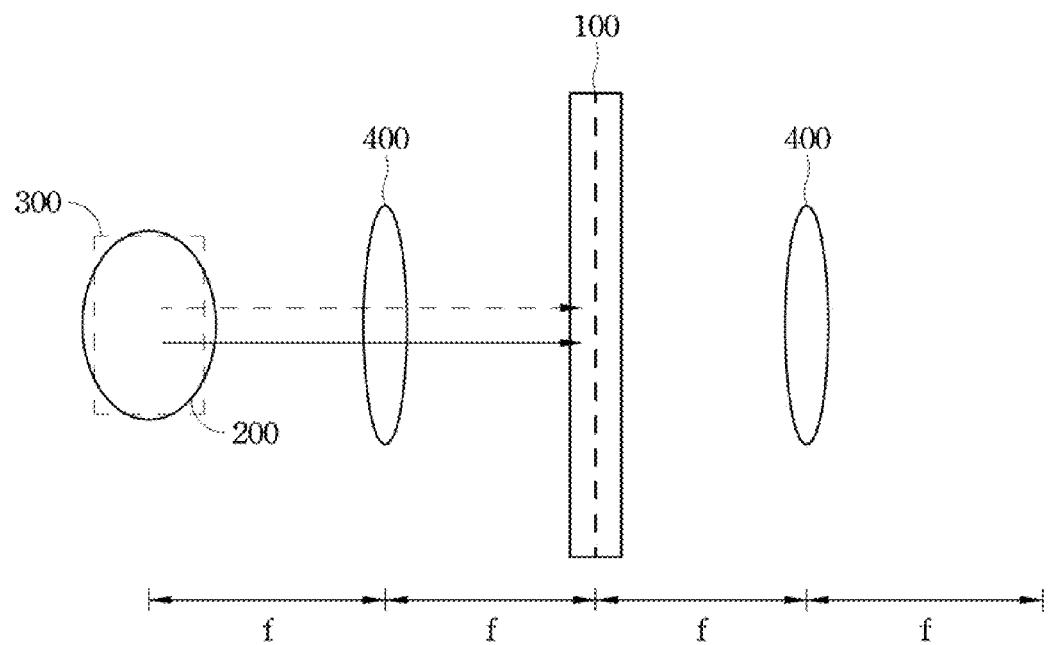
FIG. 2 is a schematic view of the transmission gratings of FIG. 1 when the data is written.

FIG. 2 is a schematic view of the transmission gratings 500 of FIG. 1 when the data is written. When the data is written, the real image of the spatial light modulator (SLM) used to modulate the signal beam 200 and the reference beam 300 locates at the front focal plane of the lens 400, wherein the focal length of the lens 400 is f. The signal beam 200 and the reference beam 300 are collinear. The lens 400 focuses the signal beam 200 and the reference beam 300 onto the collinear holographic storage medium 100, thereby creating an interference pattern in the collinear holographic storage medium 100.

Figure 3:
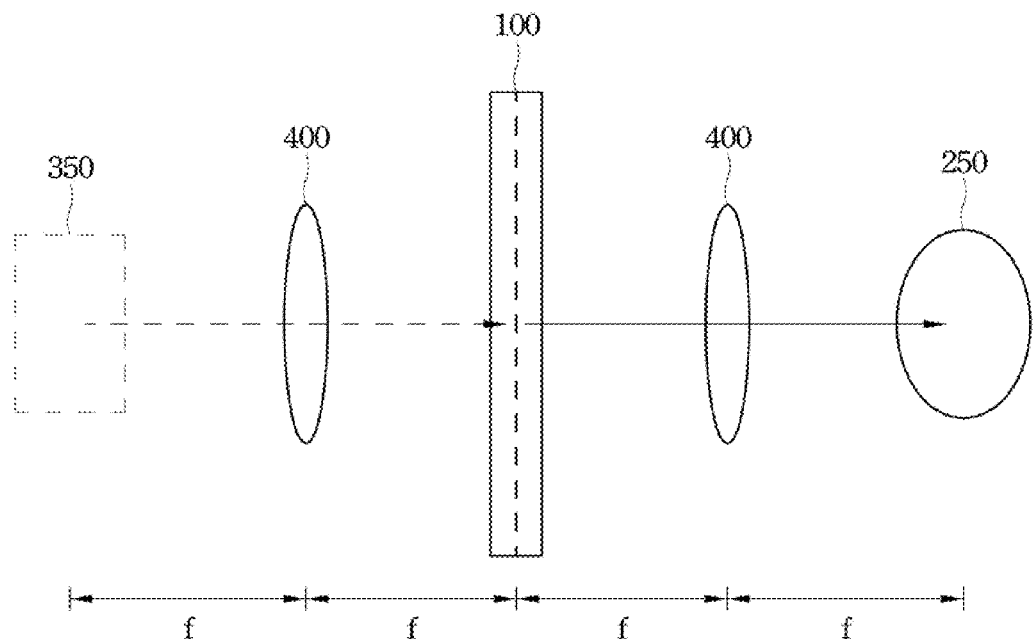
FIG. 3 is a schematic view of the transmission gratings of FIG. 1 when the data is read.

FIG. 3 is a schematic view of the transmission gratings 500 of FIG. 1 when the data is read. When the data is read, the real image of the spatial light modulator (SLM) used to modulate the reading beam 350 locates at the front focal plane of the lens 400, wherein the optical field of the reading beam 350 is substantially the same as the optical field of the reference beam 300. The lens 400 focuses the reading beam 350 onto the collinear holographic storage medium 100. Then, the reading beam 350 diffracts on the interference pattern in the collinear holographic storage medium 100. The lens 400 projects the diffracted beam 250 onto its front focal plane, thereby forming a real image at its front focal plane. The optical field of the diffracted beam 250 is substantially the same as the optical field of the signal beam 200. An image sensor can be used to detect the diffracted beam 250, thereby reading the data recorded in the collinear holographic storage medium 100.

Figure 4:
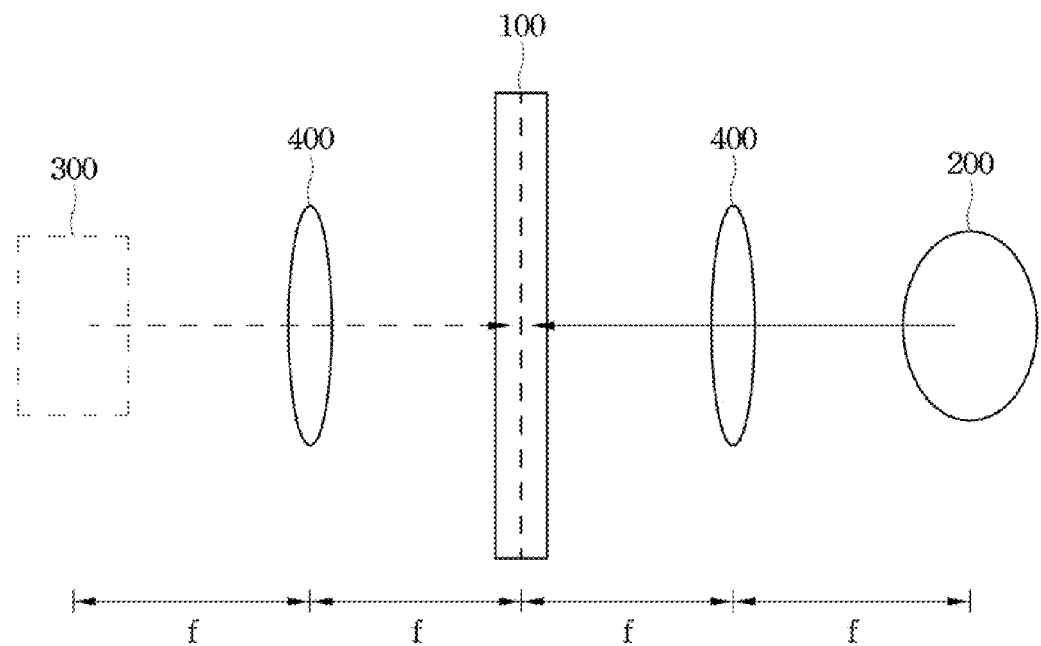
FIG. 4 is a schematic view of the reflection gratings of FIG. 1 when the data is written.

FIG. 4 is a schematic view of the reflection gratings 600 of FIG. 1 when is the data is written. The signal beam 200 and the reference beam 300 are collinear but have opposite incident directions. The signal beam 200 and the reference beam 300 illuminate the collinear holographic storage medium 100 and thus create an interference pattern in the collinear holographic storage medium 100.

Figure 5:
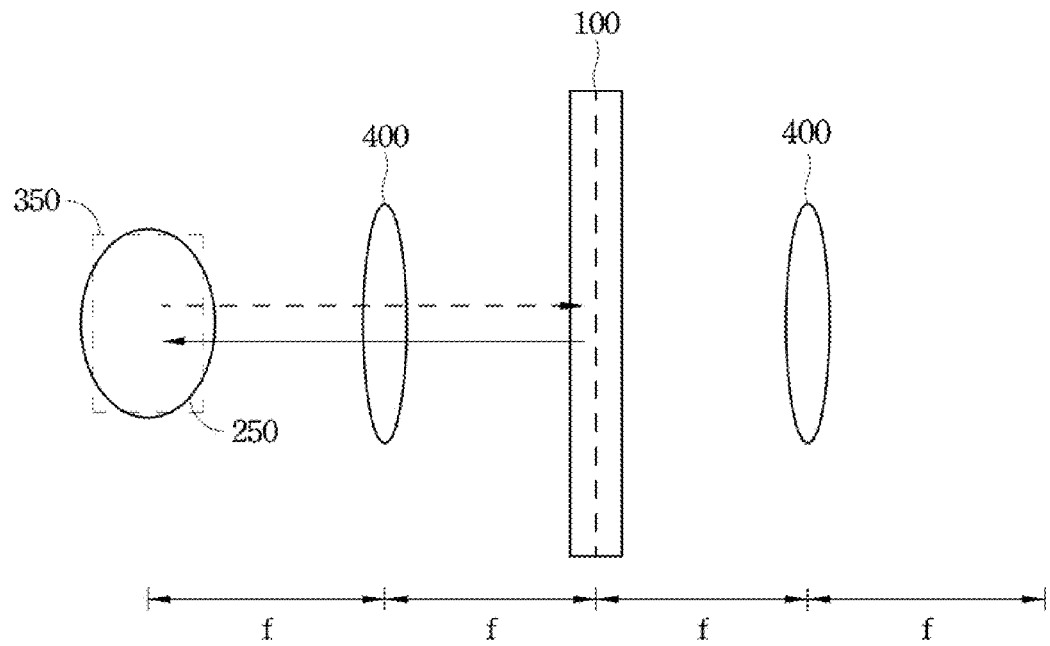
FIG. 5 is a schematic, view of the reflection gratings of FIG. 1 when the data is read.

FIG. 5 is a schematic view of the reflection gratings 600 of FIG. 1 when the data is read. When the data is read, the real image of the spatial light modulator (SLM) used to modulate the reading beam 350 locates at the front focal plane of the lens 400, wherein the optical field of the reading beam 350 is substantially the same as the optical field of the reference beam 300. The lens 400 focuses the reading beam 350 onto the collinear holographic storage medium 100. Then, the reading beam 350 diffracts on the interference pattern in the collinear holographic storage medium 100. The lens 400 reversely projects the diffracted beam 250 onto its front focal plane, thereby forming a real image at its front focal plane. The optical field of the diffracted beam 250 is substantially the same as the optical field of the signal beam 200. An image sensor can be used to detect the diffracted beam 250, thereby reading the data recorded in the collinear holographic storage medium 100.

The thermal deformation of the collinear holographic storage medium 100 can change the transmission gratings 500, the reflection gratings 600, and the refractive index of the collinear holographic storage medium 100. As a result of the thermal deformation of the collinear holographic storage medium 100, the diffracted beam 250 is weakened and has a poor point spread function (PSF).

Many research groups believe that this problem can be solved by a tunable laser and/or a new photopolymer with a lower thermal expansion. However, the thermal deformation of the collinear holographic storage medium 100 is still a problem for collinear holography. Therefore, the operational temperature range of a traditional collinear holography system is limited.

The applicants establish a paraxial approximation solution of the diffracted beam 250 produced by the collinear holographic storage medium 100.

Assuming that the defocus aberration due to the change of the refractive index of the collinear holographic storage medium 100 is compensated by the movement of the collinear holographic storage medium 100, i.e. the collinear holographic storage medium 100 is moved according to the change of the refractive index of the collinear holographic storage medium 100 when the data is written and/or read, such that the reflection layer 110 of the collinear holographic storage medium 100 is located at the back focal plane of the lens 400, the paraxial approximation solution of the diffracted beam 250 produced by the collinear holographic storage medium 100 is listed as follows:

$$U_{CCD}\left(\frac{M_\lambda M_x}{M_f}\xi, \frac{M_\lambda M_y}{M_f}\eta\right) = \frac{L}{M_z(\lambda f)^1}$$

$$\left\{ e^{jk\frac{4f}{M_\lambda M_x}} \begin{bmatrix} U_p\left(\frac{M_x M_\lambda}{M_f}(\xi_2 - \xi), \frac{M_y M_\lambda}{M_f}(\eta_2 - \eta)\right) \\ U_r^*(\xi_2 - \xi_1, \eta_2 - \eta_1)U_s(-\xi_1, -\eta_1) \end{bmatrix} \right.$$

$$\left. \operatorname{sinc}\left(\frac{-L}{2M_z\lambda f^2}\begin{pmatrix} (M_z - M_\lambda M_x^2)\xi_2^2 - 2\xi_2(M_z\xi_1 - M_\lambda M_x^2\xi) \\ (M_z - M_\lambda M_y^2)\eta_2^2 - 2\eta_2(M_z\eta_1 - M_\lambda M_y^2\eta) \end{pmatrix}\right) \right\} +$$

$$\iiint\int$$

$$\left\{ e^{jk4f}\begin{bmatrix} U_p^*\left(\frac{M_\lambda M_x}{M_f}(\xi_2 - \xi), \frac{M_\lambda M_y}{M_f}(\eta_2 - \eta)\right) \\ U_r(\xi_2 - \xi_1, \eta_2 - \eta_1)U_s(-\xi_1, -\eta_1) \end{bmatrix} \right.$$

$$\left. \operatorname{sinc}\begin{pmatrix} \frac{L}{M_z\lambda}\left(\frac{2}{M_\lambda} - 2M_z\right) + \\ \frac{L}{2M_z\lambda f^2}\begin{pmatrix} 2\xi_2(M_\lambda M_x^2\xi - M_z\xi_1) + 2\eta_2(M_\lambda M_y^2\eta - M_z\eta_1) + \\ \xi_2^2(M_z - M_\lambda M_x^2) + \eta_2^2(M_z - M_\lambda M_y^2) + \\ 2(M_z\xi_1^2 - M_\lambda M_x^2\xi^2) + 2(M_z\eta_1^2 - M_\lambda M_y^2\eta^2) \end{pmatrix} \end{pmatrix} \right\}$$

$$d\xi_1 d\eta_1 d\xi_2 d\eta_2$$

where (1) the refractive index of the recording layer 120 after the change of temperature becomes $M_n$ times that before the change of temperature, the focal length of the lens 400 after the change of temperature becomes $f/M_f$ times that before the change of temperature, and then $M_f = 1/M_n$ (paraxial approximation);

(2) $M_\lambda\lambda$ is the wavelength of light in the recording layer 120, $M_p\lambda$ is the wavelength of the reading beam 350, and then $M_\lambda = M_p/M_n$;

(3) $1/M_x$, $1/M_y$, and $1/M_z$ are the thermal deformation rates of the gratings (including the transmission gratings 500 and the reflection gratings 600) on the x, y, z axes respectively, $G_0(u, v, \Delta z)$ is the gratings before the change of temperature, and then $G_0(M_x u, M_y v, M_z \Delta z)$ is the gratings after the change of temperature;

(4) λ is the wavelength of light;
(5) k is the wave number of light;
(6) f is the focal length of the lens 400;
(7) ΔZ is the distance between the center of the collinear holographic storage medium 100 and the back focal plane of the lens 400;
(8) u and v are lateral coordinates of the collinear holographic storage medium 100;
(9) $U_s$, $U_r$, and $U_p$ are the optical fields of the signal beam 200, the reference beam 300, and the reading beam 350 at the front focal plane of the lens 400 respectively; and
(10) L is twice the thickness of the collinear holographic storage medium 100.

The paraxial approximation solution of the diffracted beam 250 seems complex but represents a clear physical meaning. This physical meaning is specified as followings:

$$U_{CCD}\left(\frac{M_\lambda M_x}{M_f}\xi, \frac{M_\lambda M_y}{M_f}\eta\right) \qquad (1)$$

is the optical field of the diffracted beam 250 after the change of temperature. The optical field of the diffracted beam 250 on the ξ axis after the change of temperature is $$\frac{M_\lambda M_x}{M_f}$$

times that before the change of temperature. The optical field of the diffracted beam 250 on the η axis after the change of temperature is $$\frac{M_\lambda M_y}{M_f}$$

times that before the change of temperature.
(2) Consider the term:

$$\left[U_p\left(\frac{M_x M_\lambda}{M_f}(\xi_2 - \xi), \frac{M_y M_\lambda}{M_f}(\eta_2 - \eta)\right)U_r^*(\xi_2 - \xi_1, \eta_2 - \eta_1)U_s(-\xi_1, -\eta_1)\right],$$

at the Gaussian image point $(\xi,\eta)=(\xi_1,\eta_1)$, if:

$$U_r(\xi, \eta) = U_p\left(\frac{M_x M_\lambda}{M_f}\xi, \frac{M_y M_\lambda}{M_f}\eta\right),$$

then the optical field of the diffracted beam 250 will be substantially the same as the optical field of the signal beam 200.

Moreover, $$\frac{1}{M_x} = \frac{1}{M_y} = 1 + \alpha_L \Delta T,$$

$$\frac{1}{M_f} = \frac{1}{M_\lambda} = 1 + \alpha_n \Delta T,$$

where $\alpha_L$ is the linear thermal expansion coefficient of the recording layer 120, $\alpha_n$ is the temperature coefficient of the refractive index of the recording layer 120, and ΔT is the temperature difference of the collinear holographic storage media 100 between reading and writing.

Therefore, if the optical magnification of the reading beam 250 is $1+\alpha_L\Delta T$ times the optical magnification of the reference beam 300, the equation $$U_r(\xi, \eta) = U_p\left(\frac{M_x M_\lambda}{M_f}\xi, \frac{M_y M_\lambda}{M_f}\eta\right)$$

can be satisfied.

The following description will provide a solution to the thermal deformation problem according to the paraxial approximation solution of the diffracted beam 250 produced by the collinear holographic storage medium 100.

Figure 6:
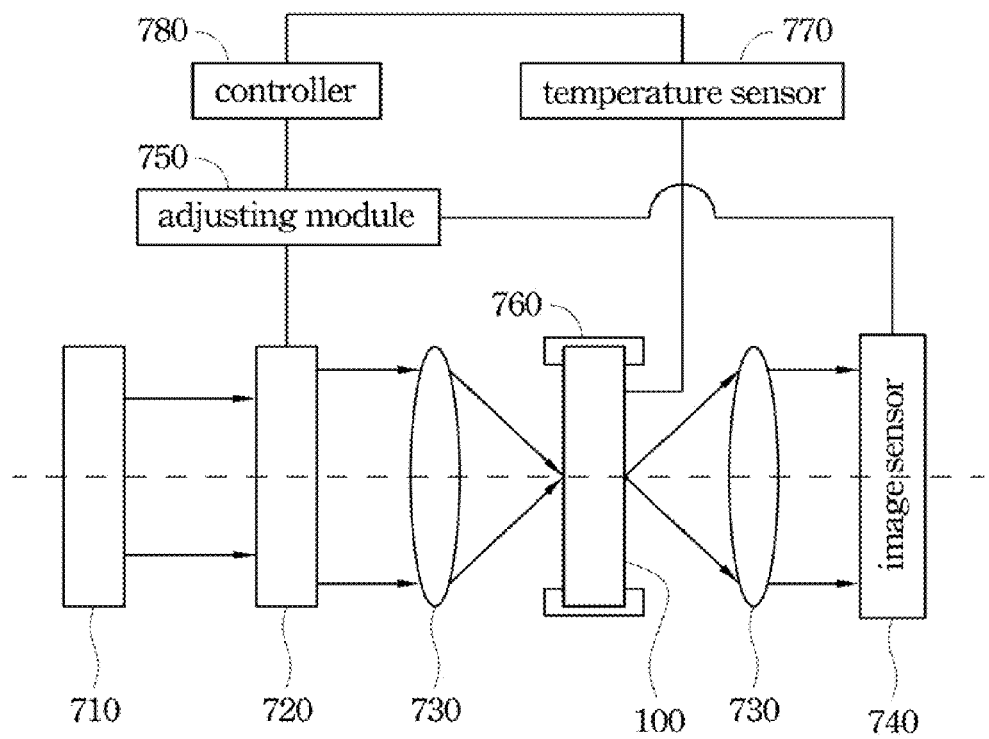
FIG. 6 is a schematic view of a reading device according to one embodiment of the present invention.

FIG. 6 is a schematic view of a reading device according to one embodiment of the present invention. The reading device includes a spatial light modulator (SLM) 710, a zoom lens set 720, an object lens 730, an image sensor 740, and an adjusting module 750. The spatial light modulator (SLM) 710 provides a reading beam. The zoom lens set 720 forms the reading beam into a real image. The object lens 730 focuses the real image onto a collinear holographic storage medium 100 and thus produces a diffraction signal. The image sensor 740 converts the diffraction signal into an electric signal. The is adjusting module 750 adjusts the optical magnification of the zoom lens set 720 according to the quality of the diffraction signal.

In order to determine the quality of the diffraction signal, in one or more embodiments, the reading device may further include a writing device. The writing device can write a servo signal in the center of the collinear holographic storage medium 100. In this embodiment, the image sensor 740 can convert the diffraction signal produced by the servo signal into the electric signal. The adjusting module 750 can adjust the optical magnification of the zoom lens set 720 only according to the quality of the diffraction signal produced by the servo signal.

In one or more embodiments, the writing device is the spatial light modulator (SLM) 710. The structural and functional details of the writing device can be found in FIGS. 1, 2, and 4 and the related specification text and are not repeated hereinafter.

Figure 7:
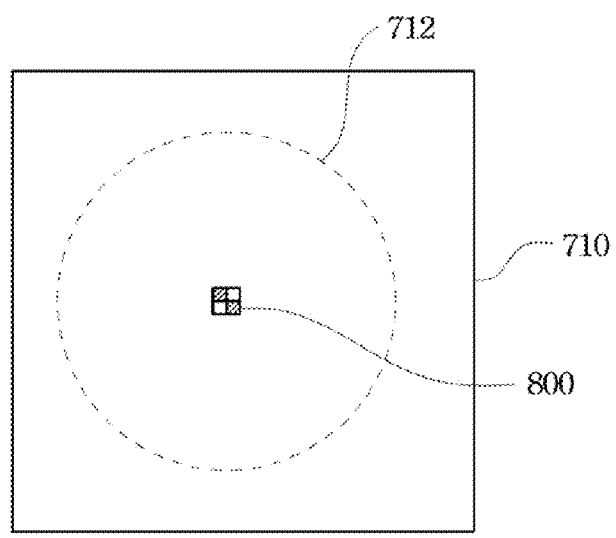
FIG. 7 is a front view of the spatial light modulator (SLM) of FIG. 6 when the servo signal is written.

FIG. 7 is a front view of the spatial light modulator (SLM) 710 of FIG. 6 when the servo signal is written. The servo signal 800 is located in the center of the signal data page 712. This is because the surround area of the signal data page 712 differs significantly from what the signal data page 712 would look like with a normal focal length when the zoom lens set 720 zooms in or zooms out. On the other hands, the center area of the signal data page 712 does not change significantly when the zoom lens set 720 zooms in or zooms out.

Accordingly, in the follow-up adjustment, the adjusting module 750 can adjust the optical magnification of the zoom lens set 720 only according to the quality of the center area of the diffraction servo signal. In this way, the change of the signal data page 712 will not interfere with the adjustment when the zoom lens set 720 zooms in or zooms out.

Figure 8A:
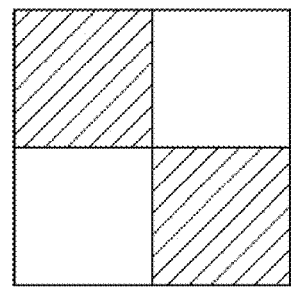
FIGS. 8a-9c are schematic views of the servo signals according to a plurality of embodiments of the present invention.
Figure 8B:
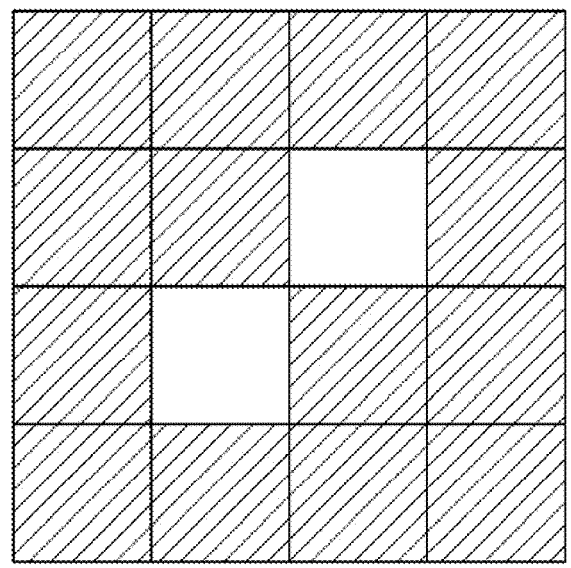
Figure 8C:
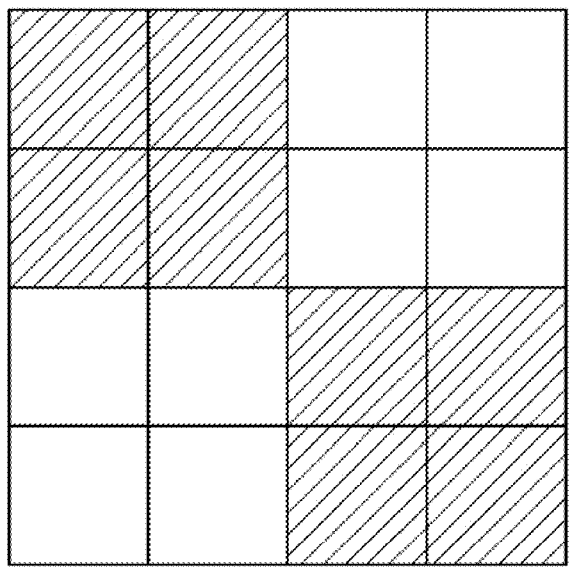
Figure 9A:
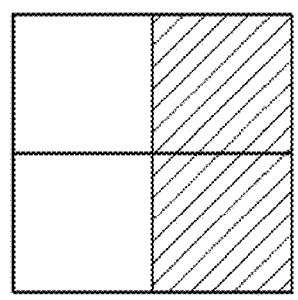
Figure 9B:
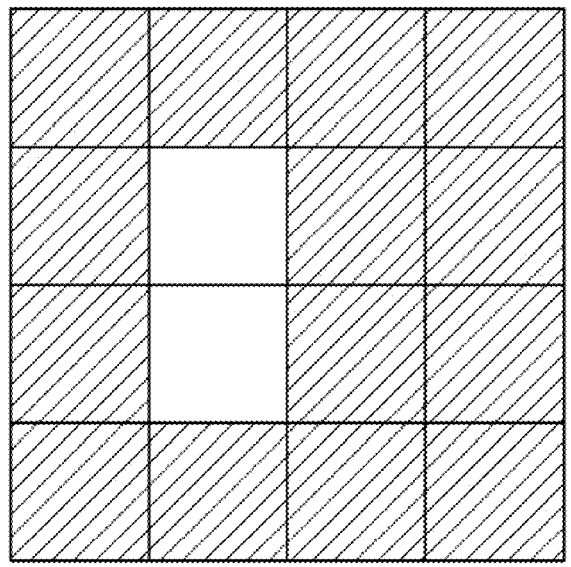
Figure 9C:
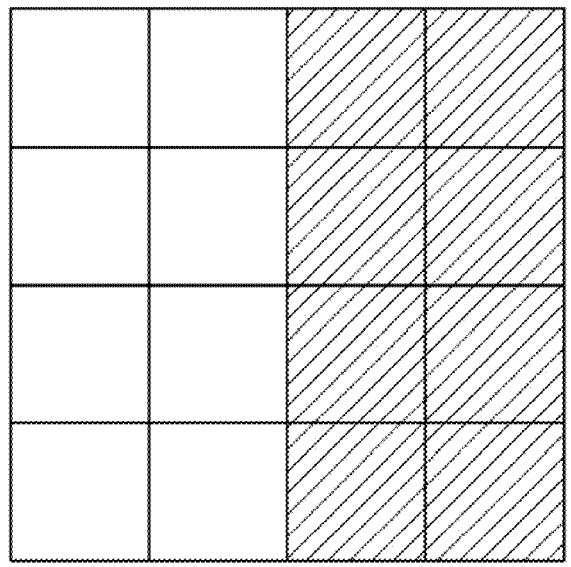

FIGS. 8a-9c are schematic views of the servo signals 800 according to a plurality of embodiments of the present invention. In one or more embodiments, the servo signal 800 (2×2) may be as shown in FIG. 8a or 9a. In one or more embodiments, in order to eliminate interference in the servo signal 800, the surrounding area of the servo signal 800 (4×4) may be all dark (as shown in FIG. 8b or 9b). In one or more embodiments, the servo signal 800 (4×4) may be as shown in FIG. 8c or 9c.

It is appreciated that many other signals may be used as the servo signal 800, for instance, the servo signal 800 shown in any one of FIGS. 8a-9c may be rotated in an angle, e.g. 90° or 180', around its own axis.

Specifically, the foregoing adjustment can be regarded as an optimization problem, wherein the cost function of the optimization problem is the quality of the diffraction signal, and the optimal solution is the optical magnification of the zoom lens set 720 which can maximize the quality of the diffraction signal.

The term "the quality of the diffraction signal" means the contrast of the diffraction signal, the signal-to-noise ratio of the diffraction signal, or combinations thereof.

Figure 10:
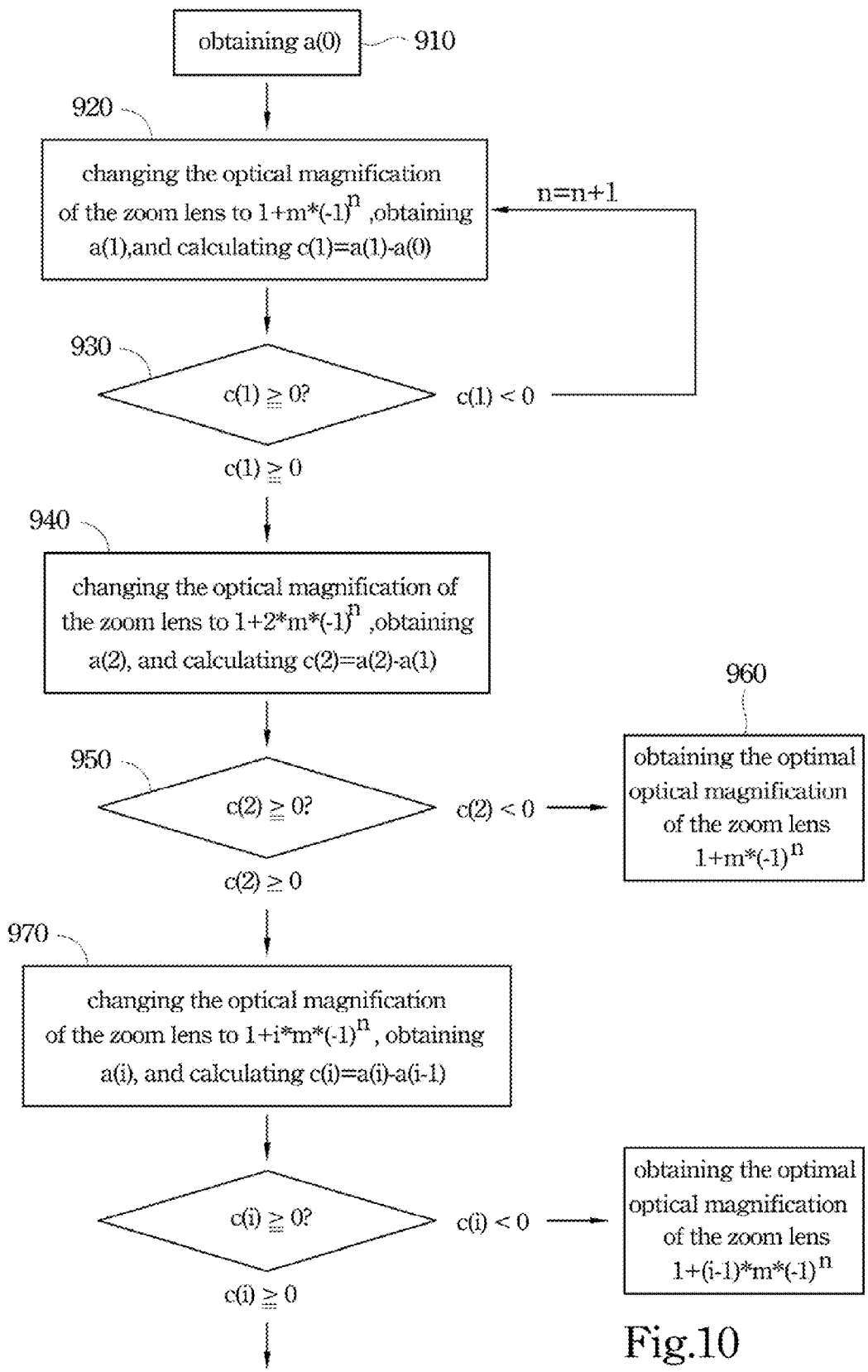
FIG. 10 is a flowchart representing a process for adjusting the optical magnification of the zoom lens set according to one embodiment of the present invention.

FIG. 10 is a flowchart representing a process for adjusting the optical is magnification of the zoom lens set 720 according to one embodiment of the present invention. First, the optical magnification of the zoom lens set 720 is sequentially increased. When the optical magnification of the zoom lens set 720 is 1.00, the contrast and/or the signal-to-noise ratio of the diffraction signal is a(0) (step 910). When the optical magnification of the zoom lens set 720 is 1.01, the contrast and/or the signal-to-noise ratio of the diffraction signal is a(1) (step 920). If c(1)=a(1)−a(0)≧0(step 930), then the optical magnification of the zoom lens set 720 is sequentially increased until c(i)=a(i)−a(i−1)<0(step 970). For example, when the optical magnification of the zoom lens set 720 is 1.02, the contrast and/or the signal-to-noise ratio of the diffraction signal is a(2) (step 940). If c(2)=a(2)−a(1)<0 (step 950), then the optimal optical magnification of the zoom lens set 720 is 1.01 (step 960). On the other hands, if c(2)=a(2)−a(1)≧0 (step 950), then the optical magnification of the zoom lens set 720 is sequentially increased until c(i)=a(i)−a(i−1)<0 (step 970).

If c(1)=a(1)−a(0)<0 (step 930), then the optical magnification of the zoom lens set 720 is sequentially decreased until c(i)=a(i)−a(i−1)<0(step 970).

Return to FIG. 6. In order to increase the reading speed, the reading device may further include a temperature sensor 770 and a controller 780. In use, the temperature sensor 770 can measure the temperature of the collinear holographic storage medium 100. The controller 780 can select the optical magnification of the zoom lens set 720 according to the temperature of the collinear holographic storage medium 100. In one or more embodiments, the controller 780 can initially select the optical magnification of the zoom lens set 720 to be:

$$\Omega = 1 + \alpha_L \Delta T$$

where $\Omega$ is the optical magnification of the zoom lens set 720 initially selected by the controller 780, $\alpha_L$ is the lateral linear thermal expansion coefficient of the recording layer, and $\Delta T$ is the temperature difference of the collinear holographic storage media 100 between reading and writing.

Figure 11:
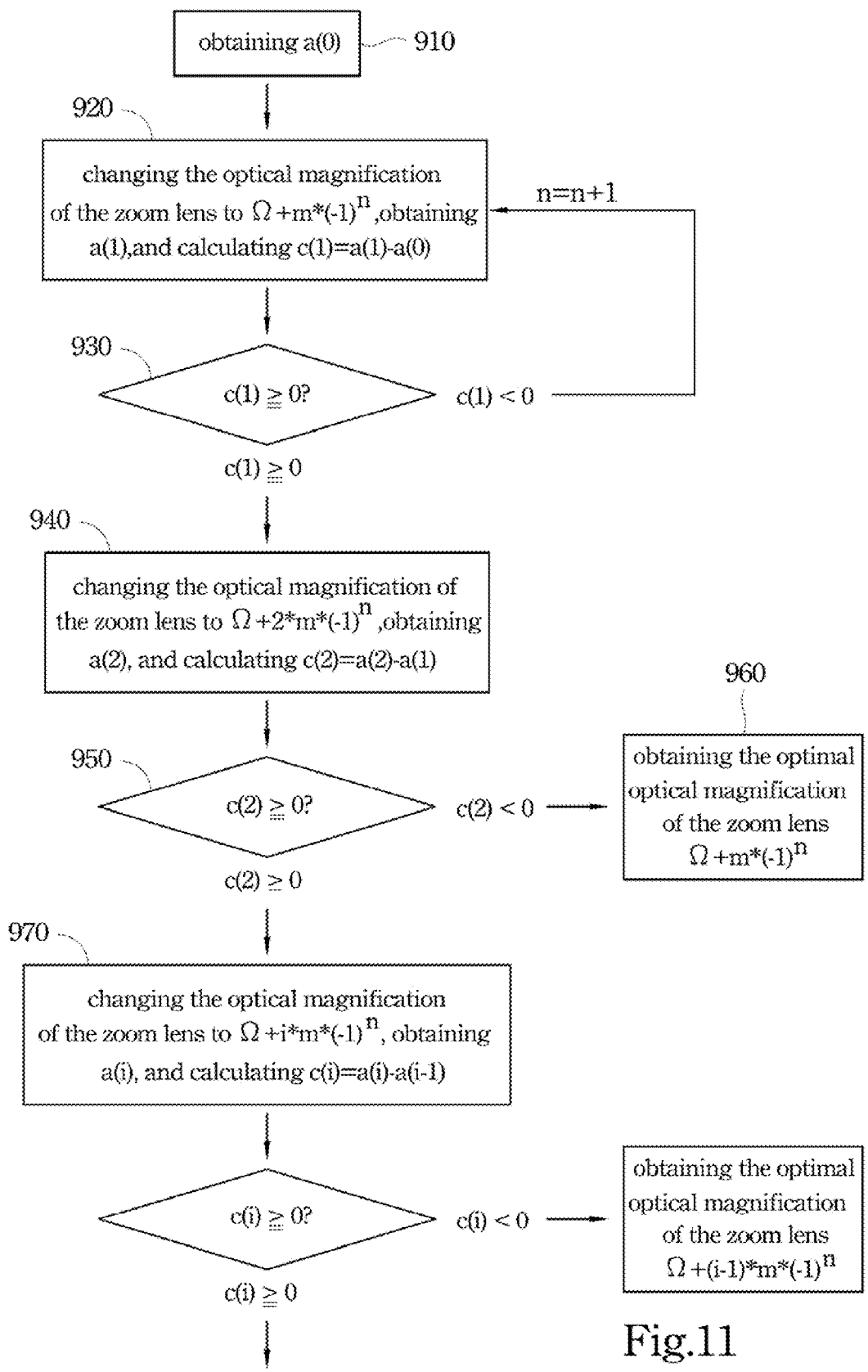
FIG. 11 is a flowchart representing a process for adjusting the optical magnification of the zoom lens set according to another embodiment of the present invention.

Then, the adjusting module 750 can adjust the optical magnification of the zoom lens set 720 according to the quality of the diffraction signal. FIG. 11 is a flowchart representing a process for adjusting the optical magnification of the zoom lens set 720 according to another embodiment of the present invention. The difference between FIGS. 10 and 11 is that the initial guess of the optical magnification of the zoom lens set 720 of FIG. 10 is 1.00, and the initial guess of the optical magnification of the zoom lens set 720 of FIG. 11 is $\Omega$. The other steps are substantially the same and are not repeated hereinafter.

It is appreciated that the optical magnification of the zoom lens set 720 can be determined by the controller 780 only, i.e. without being optimized by the adjusting module 750. In this way, the optical magnification of the zoom lens set 720 is $\Omega$.

In order to compensate the defocus aberration due to the change of the refractive index of the collinear holographic storage medium 100, in one or more embodiments, the reading device may further include a moving mechanism 760.

In use, the moving mechanism 760 can move the collinear holographic storage medium 100, such that the reflection layer of the collinear holographic storage medium 100 is located at the back focal plane of the object lens 730. The moving mechanism 760 can be a linear slide system, a lead-screw system, or is other moving mechanisms.

In one or more embodiments, the zoom lens set 720 is a parfocal lens. The parfocal lens can stay in focus when magnification/focal length is changed.

Furthermore, the reading device may let the reading beam have a constant phase along each radial axis of the reading beam. In this way, although the reading beam may be thermally deformed, the optical field of the reading beam is remained and satisfies:

$$U_r(\xi, \eta) = U_p\left(\frac{M_x M_\lambda}{M_f}\xi, \frac{M_y M_\lambda}{M_f}\eta\right).$$

Figure 12:
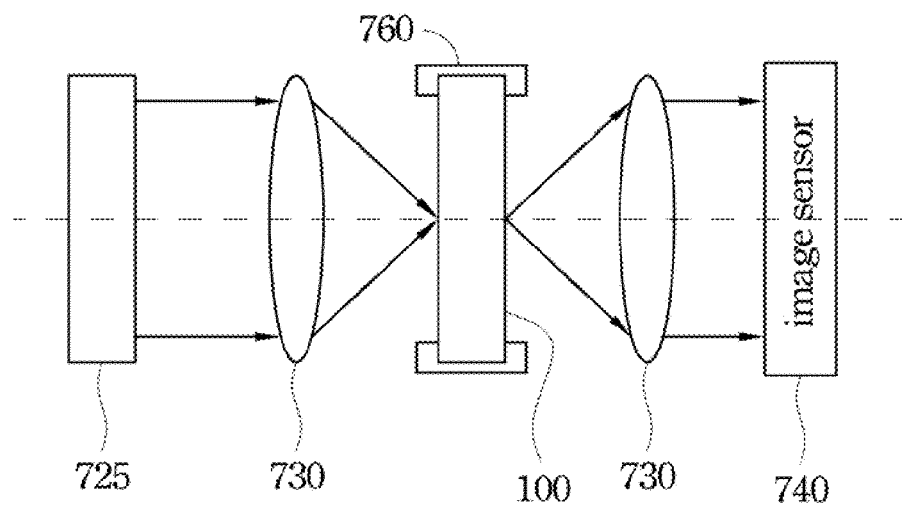
FIG. 12 is a schematic view of a reading device according to another embodiment of the present invention.

FIG. 12 is a schematic view of a reading device according to another embodiment of the present invention. The reading device includes a radial phase modulator 725, an object lens 730, and an image sensor 740. In use, the radial phase modulator 725 can modulate a reading beam, such that the modulated reading beam has a constant phase along each radial axis of the reading beam. The object lens 730 can focus the modulated reading beam onto a collinear holographic storage medium 100 and thus produce a diffraction signal. The image sensor 740 can convert the diffraction signal into an electric signal.

Figure 13:
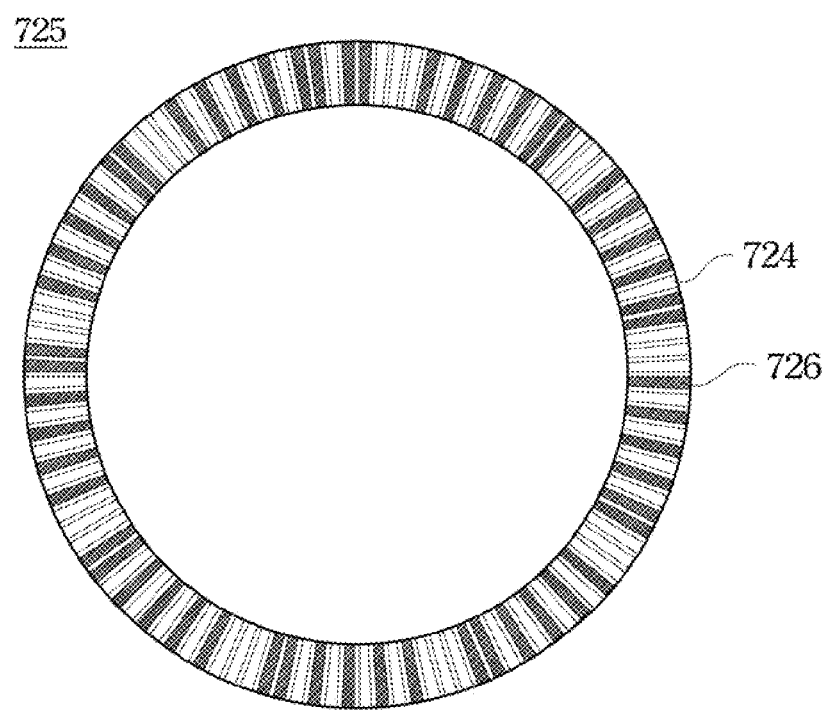
FIG. 13 is a schematic view of the radial phase modulator of FIG. 12.

FIG. 13 is a schematic view of the radial phase modulator 725 of FIG. 12. The radial phase modulator 725 has a plurality of 0 modulators 724 and a plurality of π modulators 726. The 0 modulators 724 and the π modulators 726 are randomly arranged. In FIG. 13, the regions with screentone patterns represent the π modulators 726, and the regions without screentone patterns represent the 0 modulators 724. In one or more embodiments, the radial phase modulator 725 has one hundred and twenty 0/π modulators 724/726. Every thirteen 0/π modulators 724/726 form a cycle. The 0/π modulators 724/726 in a cycle are arranged in the order of the 0 modulator 724, the 0 modulator 724, the π modulator 726, the π modulator 726, the 0 modulator 724, the π modulator 726, the 0 modulator 724, the π modulator 726, the 0 modulator 724, the π modulator 726, the 0 modulator 724, the π modulator 726, and the π modulator 726.

Figure 14:
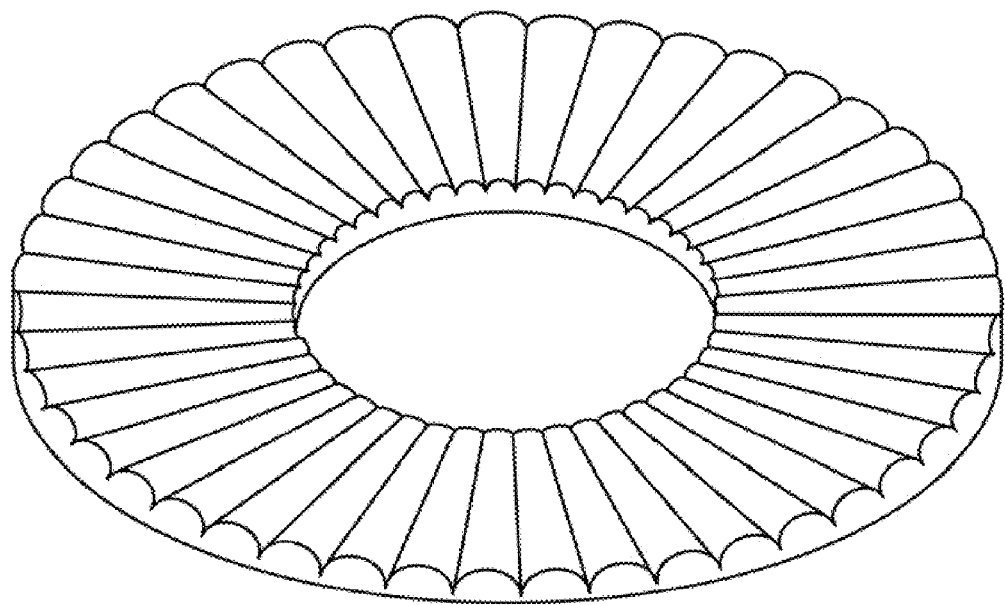
FIG. 14 is a pictorial view of a radial phase modulator according to one embodiment of the present invention.

In one or more embodiments, the radial phase modulator 725 includes a radial lens array (as shown in FIG. 14). The radial lens array has one hundred and twenty cylindrical lenses. The focal length of each cylindrical lens is about 1.8 mm.

It is appreciated that many other devices may be used as the radial phase modulator 725, for instance, a spatial light modulator (SLM) or a phase mask may be substituted for the radial lens array as the radial phase modulator 725.

Similarly, in order to compensate the defocus aberration due to the change of the refractive index of the collinear holographic storage medium 100, in one or more embodiments, the reading device may further include a moving mechanism 760. In use, the moving mechanism 760 can move the collinear holographic storage medium 100, such that the reflection layer of the collinear holographic storage medium 100 is located at the back focal plane of the object lens 730. The moving mechanism 760 can be a linear slide system, a leadscrew system, or other moving mechanisms.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims is not intended to invoke the provisions of 35 U.S.C. §112, 6th paragraph.

What is claimed is:

1. A reading device comprising:
   a spatial light modulator (SLM) for providing a reading beam;
   a zoom lens set for forming the reading beam into a real image;
   an object lens for focusing the real image onto a collinear holographic storage medium and thus producing a diffraction signal;
   an image sensor for converting the diffraction signal into an electric signal; and
   an adjusting module for adjusting the optical magnification of the zoom lens set according to the quality of the diffraction signal.

2. The reading device of claim 1, further comprising:
   a moving mechanism for moving the collinear holographic storage medium, such that a reflection layer of the collinear holographic storage medium is located at the back focal plane of the object lens.

3. The reading device of claim 1, wherein the zoom lens set is a parfocal lens.

4. A reading device comprising:
   a spatial light modulator (SLM) for providing a reading beam;
   a zoom lens set for forming the reading beam into a real image;
   an object lens for focusing the real image onto a collinear holographic storage medium;
   a temperature sensor for measuring the temperature of the collinear holographic storage medium; and
   a controller for selecting the optical magnification of the zoom lens set according to the temperature of the collinear holographic storage medium.

5. The reading device of claim 4, further comprising:
   a writing device for writing a servo signal in the center of the collinear holographic storage medium;
   an image sensor for converting a diffraction signal produced by the servo signal into an electric signal; and
   an adjusting module for adjusting the optical magnification of the zoom lens set according to the quality of the diffraction signal.

6. The reading device of claim 4, further comprising:
   a moving mechanism for moving the collinear holographic storage medium, such that a reflection layer of the collinear holographic storage medium is located at the back focal plane of the object lens.

7. The reading device of claim 4, wherein the zoom lens set is a parfocal lens.

8. A reading device comprising:
   a radial phase modulator for modulating a reading beam, such that the modulated reading beam has a constant phase along each radial axis of the reading beam;
   an object lens for focusing the modulated reading beam onto a collinear holographic storage medium and thus producing a diffraction signal;
   an image sensor for converting the diffraction signal into an electric signal.

9. The reading device of claim 8, wherein the radial phase modulator comprises a plurality of 0 modulators and a plurality of $\pi$ modulators randomly arranged.

10. The reading device of claim 8, wherein the radial phase modulator comprises a radial lens array.

11. The reading device of claim 8, wherein the radial phase modulator comprises a spatial light modulator (SLM).

12. The reading device of claim 8, wherein the radial phase modulator comprises a phase mask.

* * * * *

UNITED STATES PATENT AND TRADEMARK OFFICE
CERTIFICATE OF CORRECTION

PATENT NO. : 8,102,747 B2
APPLICATION NO. : 12/861840
DATED : January 24, 2012
INVENTOR(S) : Ching-Cherng Sun et al.

It is certified that error appears in the above-identified patent and that said Letters Patent is hereby corrected as shown below:

In the Specifications

Column 4, Lines 25-50 should read as shown on the attached page.

Signed and Sealed this
Twenty-third Day of April, 2013

Teresa Stanek Rea
*Acting Director of the United States Patent and Trademark Office*

$$U_{CCD}\left(\frac{M_\lambda M_x}{M_f}\xi, \frac{M_\lambda M_y}{M_f}\eta\right) =$$

$$\frac{L}{M_z(\lambda f)^2}\iiiint \left\{ \begin{array}{l} e^{jk\frac{4f}{M_f M_\lambda}}\left[U_p\left(\frac{M_x M_\lambda}{M_f}(\xi_2-\xi), \frac{M_y M_\lambda}{M_f}(\eta_2-\eta)\right)\right] \\ \left[U_r^*(\xi_2-\xi_1, \eta_2-\eta_1)U_s(-\xi_1,-\eta_1)\right] \\ \operatorname{sinc}\left(\frac{-L}{2M_z\lambda f^2}\begin{pmatrix}(M_z-M_\lambda M_x^2)\xi_2^2 \\ -2\xi_2(M_z\xi_1 - M_\lambda M_x^2\xi) \\ +(M_z - M_\lambda M_y^2)\eta_2^2 \\ -2\eta_2(M_z\eta_1 - M_\lambda M_y^2\eta)\end{pmatrix}\right) \end{array}\right\} +$$

$$\left\{ \begin{array}{l} e^{jk4f}\left[U_p^*\left(\frac{M_\lambda M_x}{M_f}(\xi_2-\xi), \frac{M_\lambda M_y}{M_f}(\eta_2-\eta)\right)\right] \\ \left[U_r(\xi_2-\xi_1, \eta_2-\eta_1)U_s(-\xi_1,-\eta_1)\right] \\ \operatorname{sinc}\left(\begin{array}{l}\frac{L}{M_z\lambda}\left(\frac{2}{M_\lambda} - 2M_z\right) + \\ \frac{L}{2M_z\lambda f^2}\begin{pmatrix}2\xi_2(M_\lambda M_x^2\xi - M_z\xi_1) \\ +2\eta_2(M_\lambda M_y^2\eta - M_z\eta_1) \\ +\xi_2^2(M_z - M_\lambda M_x^2) \\ +\eta_2^2(M_z - M_\lambda M_y^2) \\ +2(M_z\xi_1^2 - M_\lambda M_x^2\xi^2) \\ +2(M_z\eta_1^2 - M_\lambda M_y^2\eta^2)\end{pmatrix}\end{array}\right) \end{array}\right\} d\xi_1 d\eta_1 d\xi_2 d\eta_2$$